US008508416B2

(12) United States Patent
Chirila et al.

(10) Patent No.: US 8,508,416 B2
(45) Date of Patent: Aug. 13, 2013

(54) CAP ASSEMBLY (75) Inventors: Laurian P. Chirila, Irvine, CA (US);
Iain C. Roy, Mississauga (CA)

(73) Assignee: Psion Inc., Mississauga, Ontario (CA)

( * ) Notice: Subject to any disclaimer, the term of this patent is extended or adjusted under 35 U.S.C. 154(b) by 438 days.

(21) Appl. No.: 12/766,264

(22) Filed: Apr. 23, 2010

(65) Prior Publication Data
US 2011/0260930 A1 Oct. 27, 2011

(51) Int. Cl.
*H01Q 1/24* (2006.01)
(52) U.S. Cl.
USPC ............................................ 343/702; 343/841
(58) Field of Classification Search
USPC ................. 343/702, 718, 841, 872; 455/347,
455/348, 556.1, 556.2; 235/439, 454, 462.01,
235/462.45, 462.46, 462.47, 472.01, 472.02
See application file for complete search history.

(56) References Cited

U.S. PATENT DOCUMENTS

| | | | | |
|---|---|---|---|---|
| 5,841,402 | A * | 11/1998 | Dias et al. | 343/702 |
| 6,195,053 | B1 * | 2/2001 | Kodukula et al. | 343/702 |
| 6,333,716 | B1 * | 12/2001 | Pontoppidan | 343/702 |
| 6,749,121 | B2 * | 6/2004 | Connolly et al. | 235/472.01 |
| 7,232,072 | B1 * | 6/2007 | Bunte et al. | 235/462.45 |
| 2006/0232484 | A1 * | 10/2006 | Wulff et al. | 343/702 |
| 2007/0007353 | A1 * | 1/2007 | Danielson et al. | 235/462.46 |
| 2009/0262030 | A1 * | 10/2009 | Zweers | 343/702 |
| 2009/0295567 | A1 * | 12/2009 | Bellows | 340/539.11 |

* cited by examiner

Primary Examiner — Hoanganh Le (57) ABSTRACT

A cap assembly attachable to a main housing of a handheld device. The cap assembly includes a cap body at least partially defining one or more cavities therein, and one or more WAN antennas receivable in the cavity. In addition, the cap assembly includes an electromagnetic shield receivable in the cavity for providing each WAN antenna with a predetermined electromagnetic environment in which the impedances of the WAN antenna and the electromagnetic shield are substantially matched.

20 Claims, 8 Drawing Sheets

CAP ASSEMBLY

FIELD OF THE INVENTION

The present invention is a cap assembly attachable to a main housing of a handheld device.

BACKGROUND OF THE INVENTION

As is known, in a handheld device which includes a number of electronic components providing a variety of functionalities, electromagnetic fields which are generated by the components can affect the functioning of other such components. This problem is particularly acute in a handheld device because, due to space limitations, a relatively large number of electronic components typically are mounted in the housing of the device in close proximity to each other.

The housing of the device typically includes a main housing portion, in which most of the components are located, and a cap portion, in which certain components are located. The cap portion may include, for example, a WAN antenna and a scanner module, or imager. Depending on the user's requirements, however, different WAN antennas may be used in particular handheld devices, e.g., to meet a particular user's specifications. Similarly, it may be necessary to use a variety of scanner modules or imagers in different handheld devices, which are manufactured for different customers respectively having different requirements. However, detuning of the WAN antenna sometimes results when the scanner module is incompatible with the WAN antenna. Costs are then incurred in retuning the WAN antenna.

SUMMARY OF THE INVENTION

For the foregoing reasons, there is a need for a cap assembly which overcomes or mitigates one or more of the disadvantages of the prior art.

The invention provides flexibility in internal and/or external antenna usage, interchangeability between different scanning means, and modularity. In its broad aspect, the invention provides a cap assembly attachable to a main housing of a handheld device. The cap assembly includes a cap body at least partially defining one or more cavities therein and one or more WAN antennas receivable in the cavity. The cap assembly also includes an electromagnetic shield receivable in the cavity for providing each WAN antenna with a predetermined electromagnetic environment in which the impedances of the WAN antenna and the electromagnetic shield are substantially matched.

In another aspect, the invention additionally includes one or more scanning means receivable in said at least one cavity, and the electromagnetic shield is positioned at least partially between the scanning means and each WAN antenna.

In another of its aspects, the electromagnetic shield at least partially includes conductive material electrically connected to grounding means, for electrically grounding the electromagnetic shield.

In yet another aspect, the invention provides a handheld device including a main housing and a cap assembly attachable to the main housing. The cap assembly includes a body at least partially defining one or more cavities therein, and one or more WAN antennas receivable in the cavity. The handheld device also includes an electromagnetic shield receivable in the cavity for providing each WAN antenna with a substantially predetermined electromagnetic environment in which the impedances of the WAN antenna and the electromagnetic shield are substantially matched.

In another aspect, the invention provides an electromagnetic shield for use in a handheld device comprising one or more WAN antennas and one or more scanning means. The electromagnetic shield includes a conductive material electrically connected to grounding means in the handheld device, the conductive material being positioned between the scanning means and the WAN antenna, and the conductive material and each WAN antenna having substantially matched impedances for providing each WAN antenna with a substantially predetermined electromagnetic environment relative to the scanning means.

BRIEF DESCRIPTION OF THE DRAWINGS

The invention will be better understood with reference to the attached drawings, in which.

DETAILED DESCRIPTION

In the attached drawings, like reference numerals designate corresponding elements throughout. Reference is first made to FIGS. 1-14 to describe a handheld device in accordance with the invention indicated generally by the numeral 20. The cap assembly 20 is attachable to a main housing 22 of a handheld device 24. The cap assembly 20 preferably includes a cap body 28 at least partially defining one or more cavities 30 therein and one or more WAN antennas 32 receivable in the cavity 30. The cap assembly 20 preferably also includes an electromagnetic shield 34 receivable in the cavity 30, for providing the WAN antenna 32 with a substantially predetermined electromagnetic environment in which the impedances of the WAN antenna 32 and the electromagnetic shield 34 are substantially matched.

Figure 1:
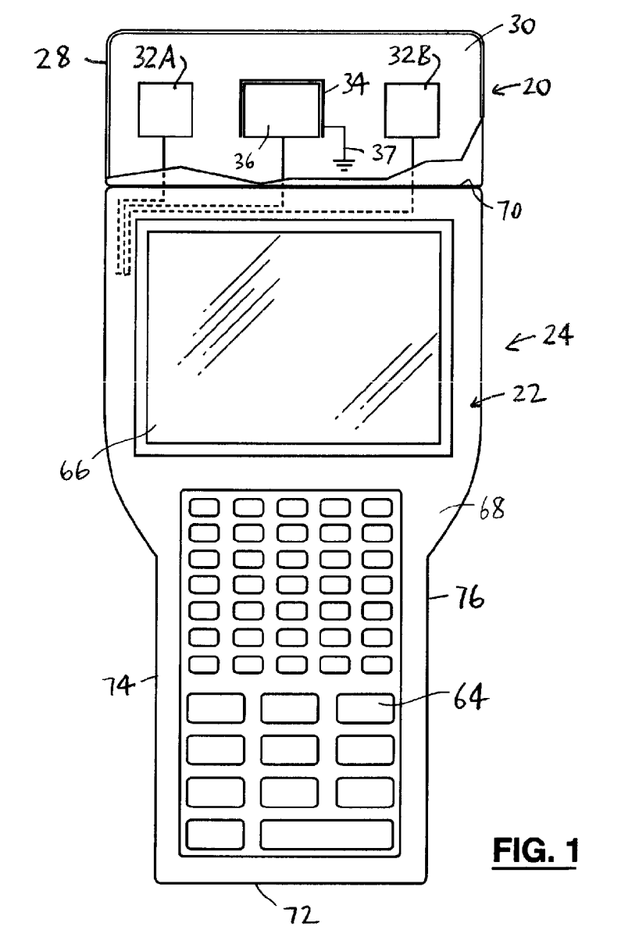
FIG. 1 is a top view, partially cut away, of an embodiment of a handheld device of the invention.
Figure 2:
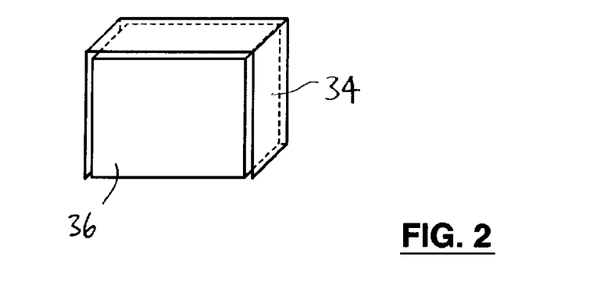
FIG. 2 is an isometric view of an embodiment of a shield element of the invention with a device positioned therein, drawn at a larger scale.

As can be seen in FIG. 1, the handheld device 22 preferably includes a keyboard 64 and a display 66, which may be positioned in or on a top surface 68 of the main housing 22. The main housing 22 preferably includes a front side 70, an opposed back side 72, and left and right sides 74, 76. As shown in FIG. 1, it is preferred that the cap assembly 20 is mounted to the main housing 22, as will be described. However, those skilled in the art will appreciate that the cap assembly may be mounted to the main housing 22 in any way desired, instead of the cap assembly 20 being mounted to the front side 70 of the main housing 22 (as shown in FIG. 1), e.g., the cap assembly 20 could be mounted to one of the sides 74, 76.

The cap assembly 20 may or may not include one or more scanning means 36, depending on the functions which the handheld device 24 is required to perform. For the purposes hereof, a "scanning means" is a scanner (i.e., a bar code scanner) or an imager (i.e., a scanner for reading a three-dimensional image).

In one embodiment, the cap assembly 20 also includes the scanning means 36 receivable in the cavity 30. Preferably, the electromagnetic shield 34 is positioned at least partially between the scanning means 36 and the WAN antenna 32.

As can be seen in FIG. 1, in one embodiment, the cap assembly 20 preferably includes two WAN antennas, identified in FIG. 1 for illustrative purposes by reference numerals 32A and 32B respectively. In the cap assembly 20 shown in FIG. 1, the electromagnetic shield 34 is positioned between the WAN antennas 32A, 32B, and the scanning means 36 is positioned inside the electromagnetic shield 34. It will be understood that the cap assembly 20 may include only one WAN antenna 32, or it may include two or more WAN antennas 32, depending on system requirements.

Preferably, the electromagnetic shield 34 at least partially includes conductive material electrically connected to grounding means 37, for electrically grounding the electromagnetic shield 34. Any suitable conductive material may be used. For instance, any metallic and ferromagnetic material(s) is a suitable conductive material. As an example, it has been determined that solder tin plated steel, approximately 0.010 inch thick, is a suitable material.

Figure 9:
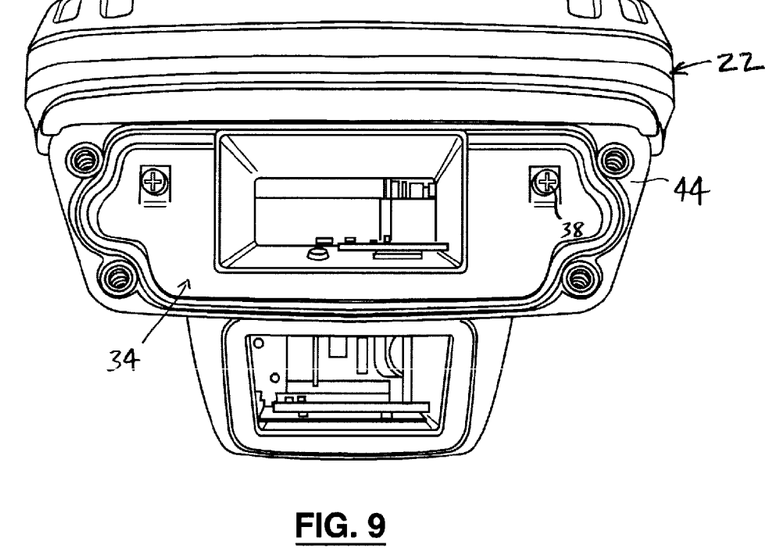
FIG. 9 is a front view of an embodiment of the main housing of the invention with the electromagnetic shield of FIG. 3 attached thereto.
Figure 10:
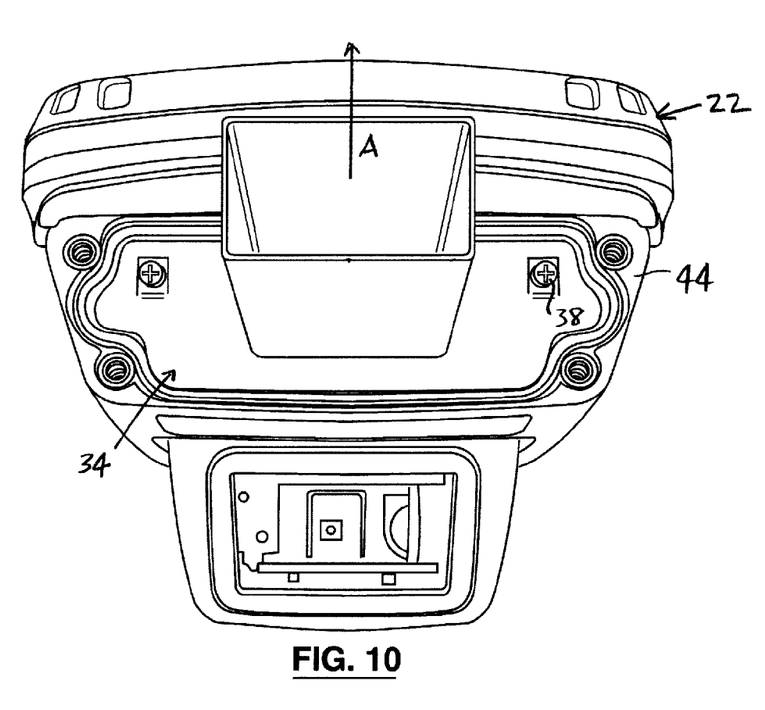
FIG. 10 is an isometric view of the electromagnetic shield and the main housing of FIG. 9.
Figure 11:
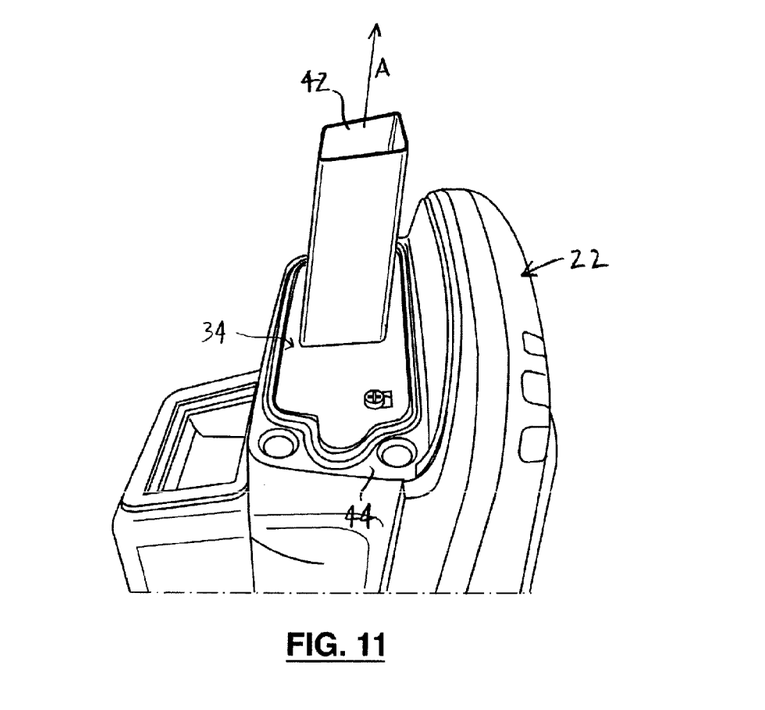
FIG. 11 is another isometric view of the electromagnetic shield and the main housing of FIG. 9.
Figure 12:
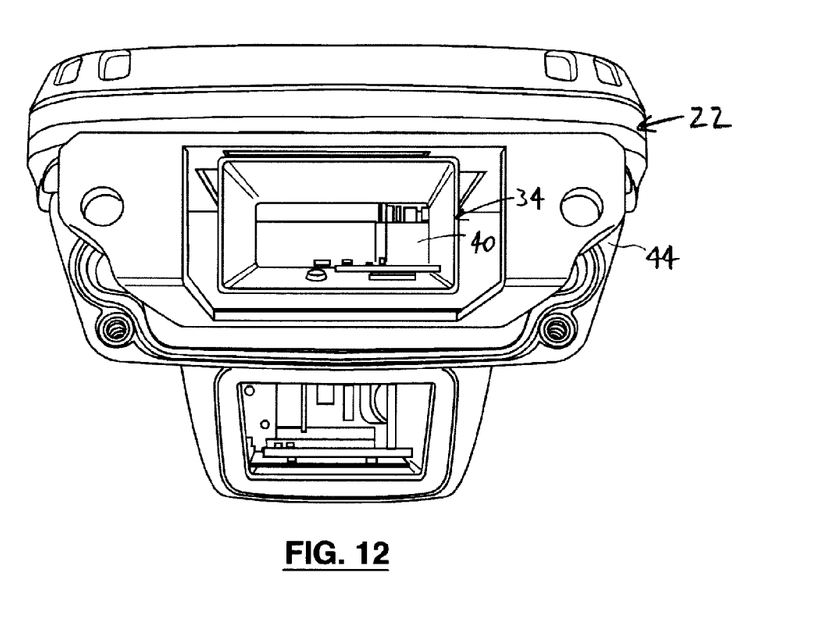
FIG. 12 is a front view of the electromagnetic shield and the main housing of FIG. 9 with the WAN antenna support element positioned on the main housing.

As can be seen in FIGS. 9-11, the electromagnetic shield 34 preferably is mounted to the main housing 22. The electromagnetic shield 34 may be attached to the main housing 22 by any suitable means. For instance, and as shown in FIGS. 9-11, the electromagnetic shield 34 preferably is attached to the main housing by suitable fasteners 38.

Figure 14:
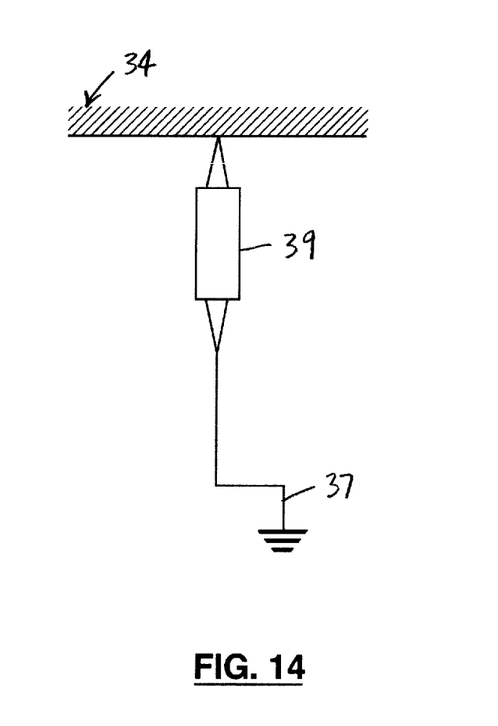
FIG. 14 is schematic illustration representing an embodiment of a resilient connector of the invention connecting the electromagnetic shield and the grounding means.

In one embodiment, the electromagnetic shield 34 preferably is at least partially attached to the main housing 22 by resilient connectors 39, for maintaining the electrical connection between the electromagnetic shield 34 and the grounding means 37 (FIG. 14). The resilient connectors 39 provide resilient mounting, so that the connection is maintained when the device is subjected to shock or vibration, e.g., if the device is dropped. The resilient connector preferably is any suitable connector. For example, the resilient connector may be any suitable pogo pin.

As is well known in the art, scanning means (i.e., a scanner or an imager, as described above) may be one of a wide variety of devices which directs light (e.g., a laser beam, in the case of a bar code scanner) toward a target (not shown) (e.g., a bar code, in the case of a bar code scanner) and receives light reflected from the target for processing by the scanning means. In the case of a bar code scanner, for instance, laser light beams are directed toward a bar code (and moved along the bar code, in a predetermined path), and the reflected laser beams are received by the bar code scanner and processed to result in digital information from the bar code. As another example, in the case of an imager, light is directed toward an object, and the light reflected therefrom is sensed by light sensors in the imager. For the purposes hereof, such transmitted light and reflected light (i.e., light transmitted from, and subsequently reflected to, the scanning means) is collectively referred to as "light".

In one embodiment, the electromagnetic shield 34 preferably at least partially defines a pocket 40 in which the scanning means 36 is receivable (FIGS. 3-11). It is also preferred that the electromagnetic shield 34 includes an opening 42 through which light (e.g., laser beams) and/or images are transmittable. As can be seen in FIG. 11, the opening 42 is oriented to provide at least one path for light to be transmitted from the scanning means 36 to the target, and light reflected from the target to be received by the scanning means 36.

It will be understood that the position of the shield 34 and the opening 42 relative to the main housing 22 as shown in FIG. 1 (i.e., in which the scanning means 36 is positioned to direct light upwardly, in a direction substantially orthogonally to the top surface 68 of the main housing 22) is for illustrative purposes. The position of the electromagnetic shield 34 and the opening 42 defined thereby illustrated in FIGS. 9-12 show the cap assembly 20 in which the scanning means 36 (not shown in FIGS. 9-12) is positioned to direct light substantially orthogonally to the front side 70 of the main housing 22.

Figure 3:
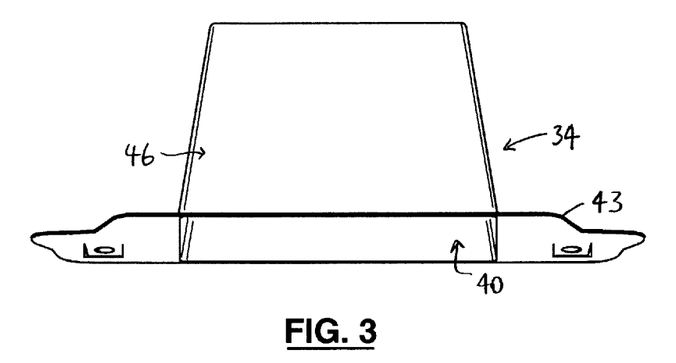
FIG. 3 is a side view of an embodiment of an electromagnetic shield of the invention, drawn at a larger scale.
Figure 4:
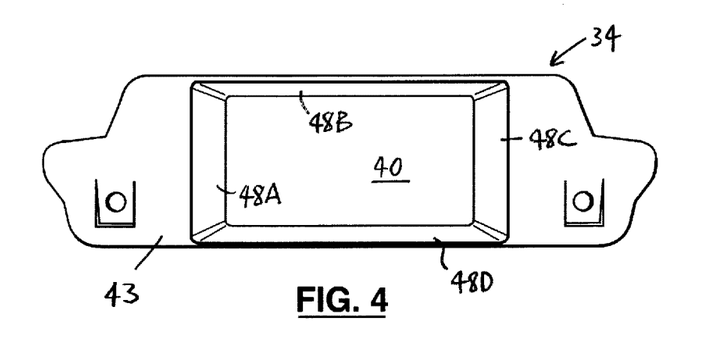
FIG. 4 is another side view of the electromagnetic shield of FIG. 3.
Figure 5:
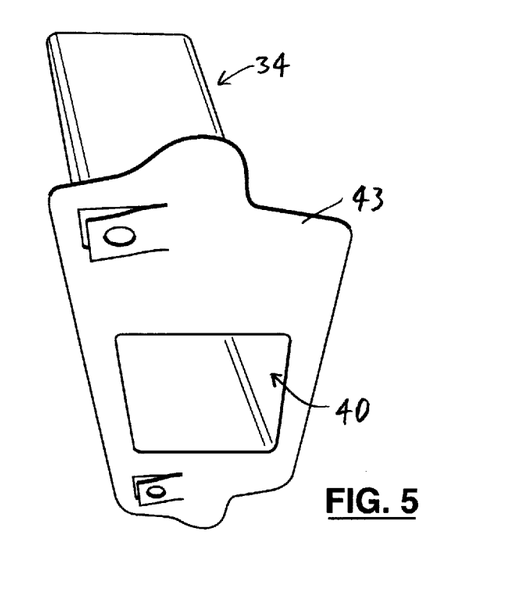
FIG. 5 is an isometric view of the electromagnetic shield of FIG. 3.

In one embodiment, the electromagnetic shield 34 preferably includes a base element 43. Preferably, the base element 43 is formed to engage a front wall 44 of the main housing 22 when the electromagnetic shield 34 is attached to the main housing 22. As can be seen in FIGS. 3-5, the electromagnetic shield 34 preferably includes a can element 46 secured to, or integrally formed with, the base element 43. Preferably, sides 48 of the can element 46 define the pocket 40. Those skilled in the art will appreciate that many different arrangements of the walls 48 are possible. As can be seen in FIG. 4, in one embodiment, the can element 46 includes four walls (designated 48A-48D in FIG. 4 for illustrative purposes) defining a generally quadrilateral pocket 40. Preferably, the base element 43 is attached to the wall 44 by the fasteners 38.

Figure 6:
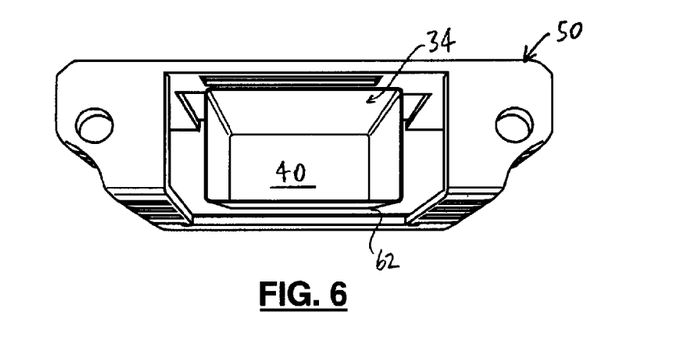
FIG. 6 is an isometric view of the electromagnetic shield of FIG. 3 positioned in an embodiment of a WAN antenna support element of the invention.
Figure 7:
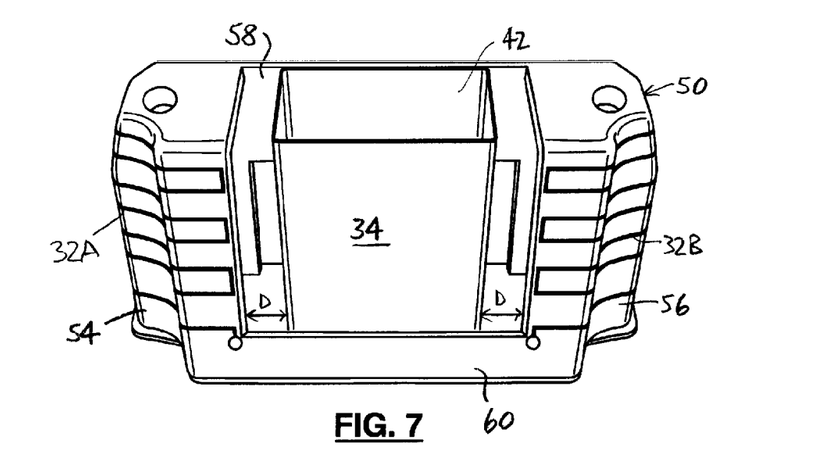
FIG. 7 is an isometric view of the electromagnetic shield and the WAN antenna support element of FIG. 6.
Figure 8:
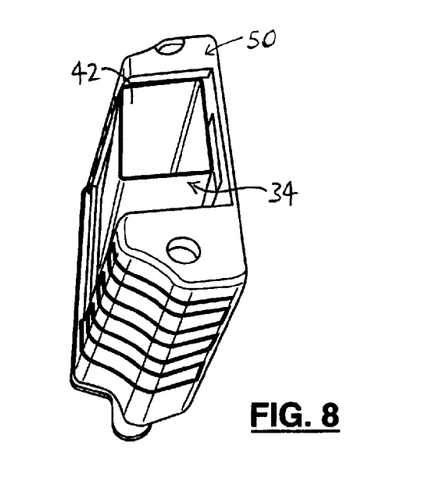
FIG. 8 is another isometric view of the electromagnetic shield and the WAN antenna support element of FIG. 6.
Figure 13:
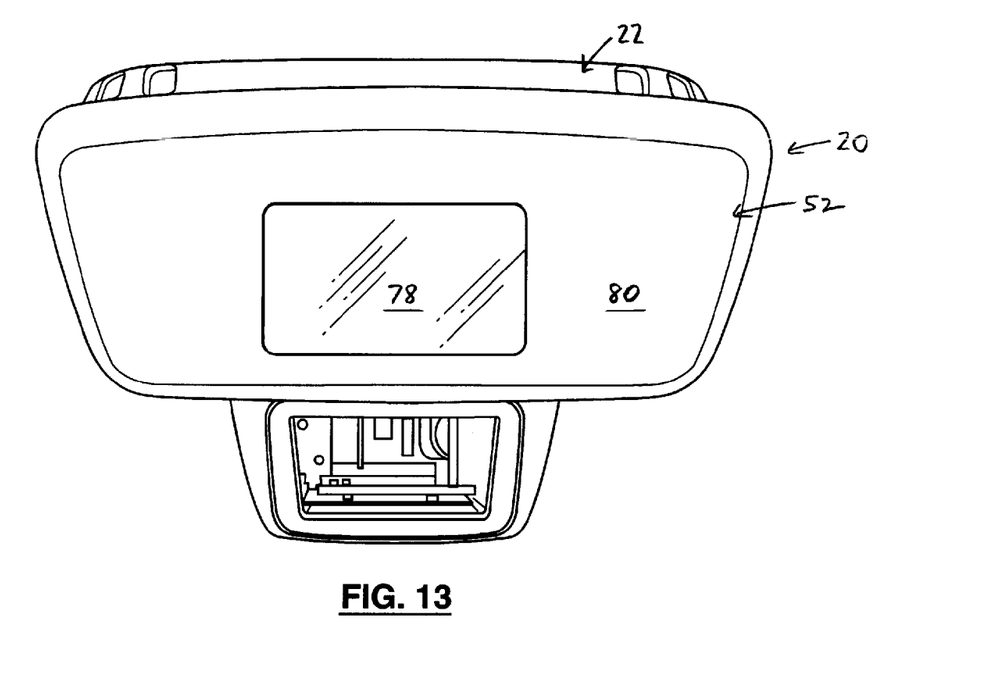
FIG. 13 is a front view of the handheld unit with an embodiment of a cover element of the invention mounted to the WAN antenna support element.

In one embodiment, the handheld device 20 preferably also includes a WAN antenna support element 50 (FIGS. 6-9 and 12). The WAN antenna support element 50 is adapted to support a cover 52 in a preselected position (FIG. 13). The WAN antenna support element 50 preferably includes side portions 54, 56 connected by top and bottom connecting pieces 58, 60 which at least partially define an aperture 62 between the side portions 54, 56 in which the can element 46 is receivable (FIGS. 6, 7). As can be seen in FIGS. 6 and 7, the side portions 54, 56 preferably are positioned so that, when the WAN antenna support element 50 is positioned on the can element 46 (i.e., when the can element 46 is received in the space 62), the side portions 54, 56 of the WAN antenna support element 50 are spaced apart from the sides 48 of the can element 46 by a predetermined distance "D" (FIG. 7). In FIGS. 6-8, WAN antennas (identified as 32A and 32B for illustrative purposes) are shown positioned on the side portions 54, 56. Those skilled in the art will appreciate that many different arrangements are possible, and the positioning of the WAN antennas 32A, 32B as shown in FIGS. 6-8 is exemplary only.

The cover 52 preferably is made of any suitable material or materials. In one embodiment, shown in FIG. 13, the cover 52 preferably includes a window portion 78 held in position by a body portion 80 of the cover 52. It will be understood that the window portion 78 preferably includes any suitable light-transmitting material, through which light passing between the scanning means 36 and the target (not shown) is transmittable. For instance, the light-transmitting material may be a transparent or translucent piece of any suitable plastic material.

As indicated above, the cap assembly 20 may not include the scanning means 36, or one or more scanning means 36 may be positioned in the cap assembly 20, which may be mounted in the cap assembly 20 as required. In use, because the impedances of the WAN antenna and the scanning means are substantially matched, then regardless of whether the cap assembly 20 includes the scanning means 36 inside the electromagnetic shield 34, a substantially constant electromagnetic environment is provided to the WAN antenna(s) in the cap assembly. In this way the electromagnetic shield provides modularity, allowing flexibility in manufacturing the handheld device for different applications, resulting in lower manufacturing costs.

Accordingly, due to the electromagnetic shield 34, a variety of scanning means (or no scanning means, as the case may be) may be utilized in handheld devices without requiring changes in the WAN antennas, i.e., to take the different electromagnetic environments into account. This configuration allows for modularity of the handheld device, i.e., different configurations of WAN antennas and/or scanning means can be selected if the scanning means is positioned inside the electromagnetic shield.

Figure 15:
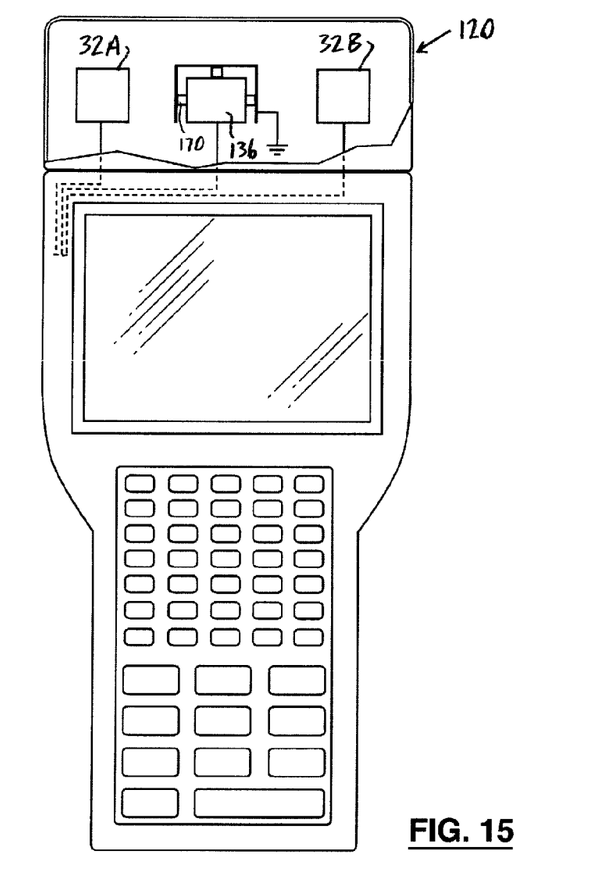
FIG. 15 is a top view, partially cut away, of an alternative embodiment of a handheld device of the invention, drawn at a smaller scale.
Figure 16:
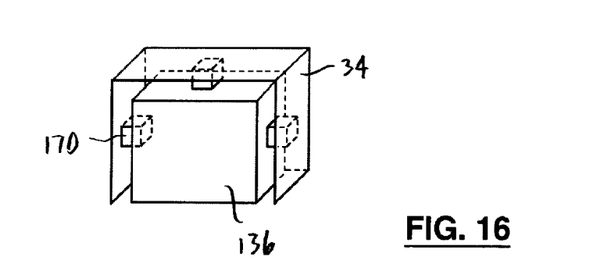
FIG. 16 is an isometric view of an alternative embodiment of a shield element of the invention, drawn at a larger scale.

The scanning means 36 may be provided in a variety of configurations, i.e., with different physical dimensions. For instance, certain versions of a scanning means 136 having a significantly smaller size are shown in FIGS. 15 and 16. Accordingly, another embodiment of the cap assembly 120 of the invention preferably includes one or more spacers 170 which are for securely positioning the smaller scanning means 136 in the pocket 40. The spacers 170 may be made of any suitable material, and positioned in the pocket between the scanning means and the electromagnetic shield 34 in any suitable manner. Preferably, the spacers 170 are formed of any suitable rigid or semi-rigid conductive material. For example, those skilled in the art would be aware of electromagnetic interference ("EMI") gaskets, which are suitable.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as described above. The foregoing descriptions are exemplary and their scope should not be limited to the preferred versions contained herein.

We claim:

1. A cap assembly attachable to a main housing of a handheld device, the cap assembly comprising:
a cap body at least partially defining at least one cavity therein;
at least one Wide Area Network (WAN) antenna receivable in said at least one cavity; and
an electromagnetic shield receivable in said at least one cavity for providing said at least one WAN antenna with a predetermined electromagnetic environment in which the impedances of said at least one WAN antenna and the electromagnetic shield are matched.

2. A cap assembly according to claim 1 further comprising:
at least one scanner receivable in said at least one cavity; and
the electromagnetic shield being positioned at least partially between said at least one scanner and said at least one WAN antenna.

3. A cap assembly according to claim 1 in which the electromagnetic shield at least partially comprises conductive material electrically connected to an electrical ground.

4. A cap assembly according to claim 3 in which the electromagnetic shield is mounted to the main housing.

5. A cap assembly according to claim 4 in which the electromagnetic shield is at least partially attached to the main housing by resilient connectors, for maintaining the electrical connection between the electromagnetic shield and the electrical ground.

6. A cap assembly according to claim 2 in which the electromagnetic shield at least partially defines a pocket in which said at least one scanner is receivable.

7. A cap assembly according to claim 1 in which the electromagnetic shield comprises an opening through which light is transmittable.

8. A cap assembly according to claim 6 further comprising at least one spacer element for securely positioning said at least one scanner in the pocket in the electromagnetic shield.

9. A handheld device comprising:
a main housing;
a cap assembly attachable to the main housing, the cap assembly comprising:
a body at least partially defining at least one cavity therein;
at least one Wide Area Network (WAN) antenna receivable in said at least one cavity; and
an electromagnetic shield receivable in said at least one cavity for providing said at least one WAN antenna with a predetermined electromagnetic environment in which the impedances of said at least one WAN antenna and the electromagnetic shield are matched.

10. A handheld device according to claim 9 in which the cap assembly further comprises at least one scanner receivable in said at least one cavity and positioned such that the electromagnetic shield is between said at least one scanner and said at least one WAN antenna.

11. A handheld device according to claim 9 in which the electromagnetic shield is formed to define at least one opening through which light is transmittable.

12. A handheld device according to claim 9 in which the electromagnetic shield at least partially comprises conductive material electrically connected to an electrical ground.

13. A handheld device according to claim 12 in which the electromagnetic shield is mounted to the main housing.

14. A handheld device according to claim 13 in which the electromagnetic shield is at least partially attached to the main housing portion by resilient connectors, for maintaining the electrical connection of the electromagnetic shield and the electrical ground.

15. A handheld device according to claim 10 in which the electromagnetic shield at least partially defines a pocket in which said at least one scanner is receivable.

16. A handheld device according to claim 15 further comprising at least one spacer element for securely positioning said at least one scanner in the pocket in the electromagnetic shield.

17. An electromagnetic shield for use in a handheld device comprising at least one Wide Area Network (WAN) antenna and at least one scanner, the electromagnetic shield comprising:
- a conductive material electrically connected to an electrical ground in the handheld device, the conductive material being positioned between said at least one scanner and said at least one WAN antenna; and
- the conductive material and said at least one WAN antenna having matched impedances for providing said at least one WAN antenna with a predetermined electromagnetic environment relative to said at least one scanner.

18. An electromagnetic shield according to claim 17 at least partially defining a pocket in which said at least one scanner is receivable.

19. An electromagnetic shield according to claim 18 further comprising at least one spacer element for securely positioning said at least one scanner in the pocket.

20. An electromagnetic shield according to claim 17 further comprising resilient connectors for resiliently connecting at least a portion of the conductive material to the electrical ground.

* * * * *